United States Patent
Gustafsson et al.

(10) Patent No.: US 10,433,205 B2
(45) Date of Patent: Oct. 1, 2019

(54) NETWORK NODE, METHOD THEREIN, COMPUTER PROGRAM, AND CARRIER COMPRISING THE COMPUTER PROGRAM FOR RETRANSMITTING AN RLC PDU

(71) Applicant: Telefonaktiebolaget LM Ericsson (publ), Stockholm (SE)

(72) Inventors: Christer Gustafsson, Huddinge (SE); Anders Ohlsson, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/767,403

(22) PCT Filed: Nov. 4, 2015

(86) PCT No.: PCT/SE2015/051169
§ 371 (c)(1),
(2) Date: Apr. 11, 2018

(87) PCT Pub. No.: WO2017/078584
PCT Pub. Date: May 11, 2017

(65) Prior Publication Data
US 2018/0302821 A1    Oct. 18, 2018

(51) Int. Cl.
*H04L 1/18*    (2006.01)
*H04W 28/04*   (2009.01)
(Continued)

(52) U.S. Cl.
CPC ............. *H04W 28/04* (2013.01); *H04L 1/188* (2013.01); *H04L 1/1812* (2013.01);
(Continued)

(58) Field of Classification Search
None
See application file for complete search history.

(56) References Cited

U.S. PATENT DOCUMENTS

| 8,958,411 B2 * | 2/2015 | Chun ............... H04L 1/1685 370/346 |
| 2003/0007480 A1 * | 1/2003 | Kim ............... H04L 1/1812 370/349 |

(Continued)

FOREIGN PATENT DOCUMENTS

| EP | 1821446 A2 | 8/2007 |
| WO | 2008051126 A1 | 5/2008 |
| WO | 2010147956 A1 | 12/2010 |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 12)", Technical Specification, 3GPP TS 36.331 V12.1.0, Mar. 1, 2014, pp. 1-356, 3GPP.

(Continued)

*Primary Examiner* — Ajit Patel
(74) *Attorney, Agent, or Firm* — Sage Patent Group (57) ABSTRACT

A method performed by a network node for retransmitting a Radio Link Control, Protocol Data Unit (RLC PDU), to a UE is provided. The UE and the network node operate in a wireless communications network. The UE is configured to use Discontinuous Reception (DRX). When an RLC PDU transmitted to the UE is indicated to not being received by the UE, the network node determines (601) a time until a first DRX on-duration time period that is possible to allow time for Hybrid Automatic Repeat Request (HARQ) operations to complete a retransmission of a Medium Access Control (MAC) PDU. The MAC PDU is associated to the RLC PDU. The network node then initiates a retransmission (603) of the RLC PDU to the UE according to the determined time.

11 Claims, 9 Drawing Sheets

(51) Int. Cl.
*H04W 76/28* (2018.01)
*H04W 80/02* (2009.01)

(52) U.S. Cl.
CPC ........... *H04L 1/1887* (2013.01); *H04W 76/28* (2018.02); *H04W 80/02* (2013.01)

(56) References Cited

U.S. PATENT DOCUMENTS

| | | | | |
|---|---|---|---|---|
| 2008/0101312 A1* | 5/2008 | Suzuki | ................. | H04L 1/0007 370/342 |
| 2009/0034476 A1* | 2/2009 | Wang | .................... | H04W 28/06 370/331 |
| 2009/0312007 A1* | 12/2009 | Kallio | ................... | H04W 76/19 455/422.1 |
| 2009/0327830 A1* | 12/2009 | Lee | ....................... | H04L 1/1887 714/749 |
| 2010/0118719 A1* | 5/2010 | Ishii | ...................... | H04L 1/0003 370/252 |
| 2010/0296431 A1* | 11/2010 | Terry | .................... | H04L 1/1812 370/315 |
| 2012/0044822 A1* | 2/2012 | Kim | ...................... | H04W 24/10 370/252 |
| 2014/0198643 A1* | 7/2014 | Conway | ................ | H04W 24/08 370/230 |
| 2014/0341189 A1* | 11/2014 | Yang | .................... | H04L 1/1812 370/331 |
| 2015/0009874 A1* | 1/2015 | Edara | ................ | H04W 52/0225 370/311 |
| 2015/0215825 A1* | 7/2015 | Kim | .................. | H04W 36/0088 370/331 |
| 2016/0352467 A1* | 12/2016 | Rawat | ................... | H04L 1/1848 |

OTHER PUBLICATIONS

Wikipedia, "Handover", online article, retrieved from internet: https://en.wikipedia.org/wiki/Handover, originally retrieved on Oct. 21, 2015, pp. 1-6, copy retireved on Apr. 10, 2018, retrieved from https://en.wikipedia.org/w/index.php?title=Handover&oldid= 667345219, pp. 1-6.

\* cited by examiner

NETWORK NODE, METHOD THEREIN, COMPUTER PROGRAM, AND CARRIER COMPRISING THE COMPUTER PROGRAM FOR RETRANSMITTING AN RLC PDU

TECHNICAL FIELD

Embodiments herein relate to a network node, a method therein, a computer program and a carrier comprising the computer program. In particular, they relate to retransmitting a Radio Link Control (RLC) Protocol Data Unit (PDU).

BACKGROUND

Wireless devices or terminals for communication are also known as e.g. User Equipments (UE), mobile terminals, wireless terminals and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server, such as server providing video streaming service, via a Radio Access Network (RAN) and possibly one or more core networks, comprised within the cellular communications network.

Wireless devices may further be referred to as mobile telephones, cellular telephones, computers, or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

A cellular communications network covers a geographical area which is divided into cell areas, wherein each cell area is served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. The base stations and wireless devices involved in communication may also be referred to as transmitter-receiver pairs, where the respective transmitter and receiver in a pair may refer to a base station or a wireless device, depending on the direction of the communication. Two wireless devices involved in D2D communication may also be referred to as a transmitter-receiver pair. In the context of this disclosure, the expression Downlink (DL) is used for the transmission path from the base station to a wireless device. The expression Uplink (UL) is used for the transmission path in the opposite direction i.e. from the wireless device to the base station.

Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UMTS Terrestrial Radio Access Network (UTRAN) is essentially a radio access network using wideband code division multiple access for communication with terminals. The 3GPP has undertaken to evolve further the UTRAN and GSM based radio access network technologies.

In 3rd Generation Partnership Project (3GPP) Long Term Evolution (LTE), base stations, which may be referred to as eNodeBs or even eNBs, may be directly connected to one or more core networks.

In LTE two mechanisms may be used to detect and correct the errors. The first mechanism Hybrid Automatic Repeat reQuest (HARQ) is implemented to correct the error packets in the PHY layer. Furthermore, there may be some packets that are still left with errors but may be acceptable to some applications. Hence, these are passed to upper layers. The second mechanism Automatic Repeat reQuest (ARQ) is implemented in the higher RLC layer which handles these residual errors. It either repairs those errors or discards the packets.

ARQ works at RLC layer. If the received data has an error detected by ARQ then it is discarded, and a new re-transmission is requested from the sender.

HARQ works at PHY layer but is controlled by Medium Access Control (MAC) layer. If the received data has an error then the Receiver buffers the data and requests a re-transmission from the sender. When the receiver receives the re-transmitted data, it then combines it with buffered data prior to channel decoding and error detection.

RLC ARQ

3GPP specifies E_UTRAN RLC protocol. An RLC entity such as receiving side and transmitting side may be configured to perform data transfer in one of the following three modes: RLC Transparent Mode (TM), RLC Unacknowledged Mode (UM) or RLC Acknowledge Mode (AM). The ARQ part is only supported in the RLC Acknowledge Mode. The ARQ in RLC is an error-control method for data transmission that uses acknowledgements, such as messages sent by the receiver indicating that it has correctly received the packet, and timeouts such as specified periods of time allowed to elapse before an acknowledgment is to be received, to achieve reliable data transmission over an unreliable link. If the sender does not receive an acknowledgment before the timeout, it re-transmits the packet at given intervals until the sender either receives an acknowledgment or if it exceeds the maximum number of retransmissions. If the maximum number of re-transmissions is reached, RLC will indicate that to upper layer, such as Radio Resource Control (RRC).

The mode used by an RLC entity is decided by Radio Resource Control (RRC) protocol for each radio bearer and it is signaled from eNB to UE at radio bearer setup. The RRC protocol layer is e.g. comprised in UE and eNB, and it is part of LTE air interface control plane.

An RLC UM transmitter may segment and concatenate Service Data Unit (SDU)s into RLC PDUs to be sent to lower layer, as MAC. The RLC UM receiver reassembles the SDUs. This gives a higher flexibility to the lower layers which can adapt to whatever transfer possibilities are provided by a scheduler and the radio link. RLC SDUs which have missing segments due to errors in lower layers are discarded in RLC UM receiver, which also discards duplicates.

The RLC AM mode supports ARQ in addition to the functions described above. The ARQ part makes it possible to have missing PDUs or portions of PDUs to be retransmitted. The transmitting side of a RLC AM entity receives status PDUs from its receiver peer informing about which PDU sequence numbers have been received and which have not been received. A PDU that has not been reported as received will be retransmitted after a configured amount of time. Failure to deliver SDUs to higher layers in AM results in RLC delivery failure which is determined by a threshold defining maximum number of retransmissions in the transmitter side which in turn results in Radio Link Failure (RLF).

As mentioned above, adding RLC ARQ on top of HARQ decreases the probability of packet loss a lot. Here on top of means on a layer above. This is since RLC Status PDUs are Cyclic Redundancy Check (CRC)-protected and it is therefore very unlikely that an AM RLC entity misinterprets the feedback from its peer, something that may happen more frequently with the single bit feedback used by HARQ. RLC Status PDU here means feedback from its RLC peer.

However, the cost is an increased delay and more schedulings are required, such as e.g. for retransmissions and feedback. The drawbacks are that retransmissions on RLC level takes a relatively long time compared to HARQ retransmissions since the RLC retransmission timer needs to be long enough to give MAC a chance to deliver the RLC PDUs to avoid unnecessary RLC retransmissions and further that resources used in the initial transmit attempt are wasted as opposed to HARQ retransmission where soft combining is used. Soft combining means combining data received from previous transmissions. With this in mind, usage of AM RLC is typically restricted to services that are more tolerable to delay than to packet losses.

In LTE the Signalling Radio Bearers (SRBs) are configured to use RLC AM.

Discontinuous Reception (DRX)

The "always-on" type of behavior that is arriving with smartphone UEs adds much strain on the battery economy in the UE. There are different methods in LTE to limit the power consumption in the UE; one such method being DRX.

A UE is in RRC_CONNECTED when an RRC connection has been established between the UE and an eNB. If no RRC connection is established, the UE is in RRC_IDLE state.

DRX may be applied both in RRC_IDLE and in RRC_CONNECTED. The principles are the same. The description hereafter applies to DRX during RRC_CONNECTED since that maps best to the above mentioned "always-on" type of behavior.

Figure 1:
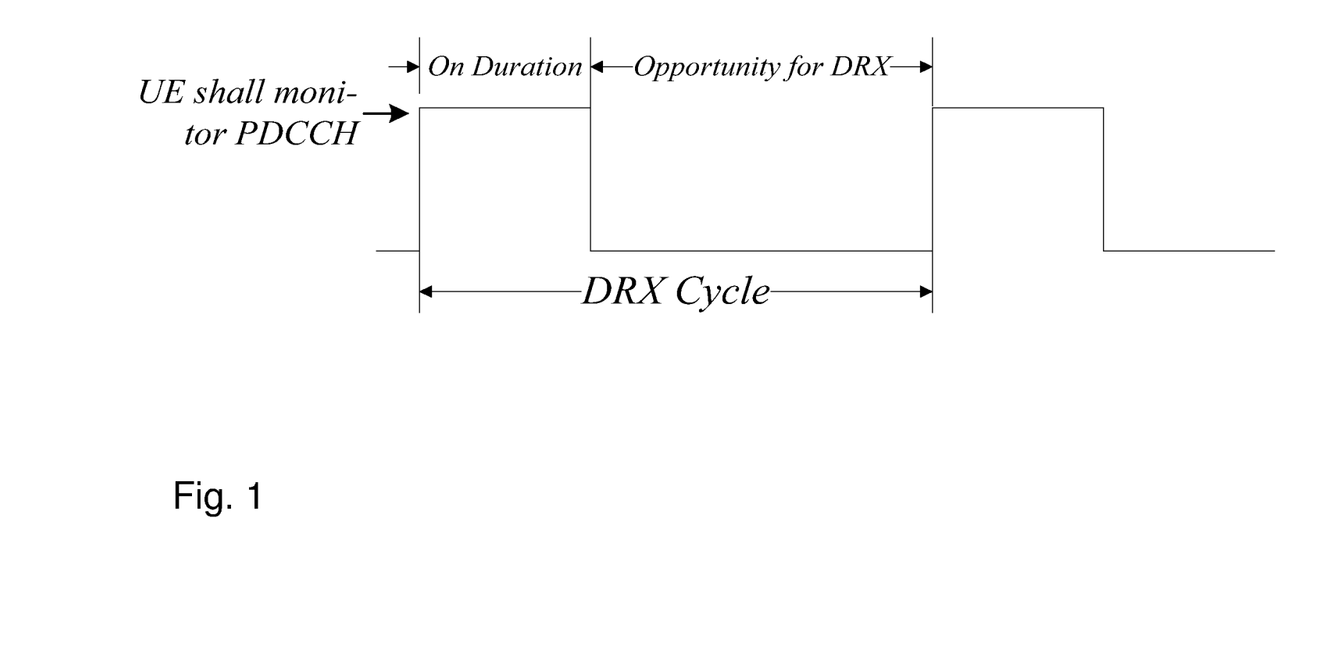
FIG. 1 is a schematic block diagram illustrating prior art.
Figure 2:
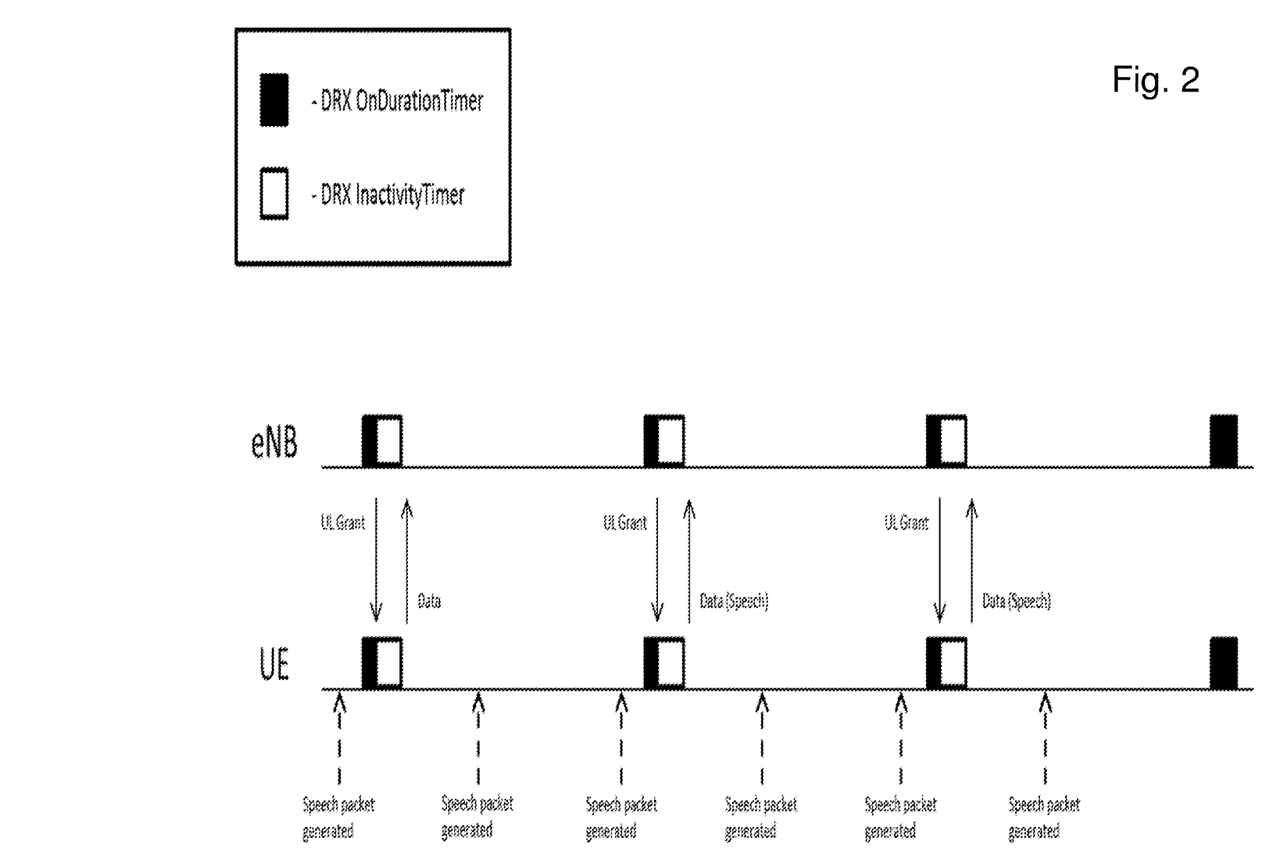
FIG. 2 is a schematic block diagram illustrating prior art.

DRX is a method to reduce battery consumption in the UE by allowing the UE to stop monitoring the Physical Downlink Control Channel (PDCCH), i.e., it can turn off the receiver during lengthy times and just discontinuously listen during short on-duration phases. The time periods where the receiver is turned off are configured by the network and acknowledged by the UE. The reoccurring periods of the on-duration phase is illustrated in FIG. 1.

DRX Active Time. The standard, 3GPP TS36.321, defines the Active Time as the aggregated phases while either:
- onDurationTimer or drx-InactivityTimer or drx-RetransmissionTimer which is used to supervise any DL retransmission that UE expects, or mac-ContentionResolutionTimer which is used to supervise the completion of random access, is running; or
- a Scheduling Request for UL transmission is sent on Physical Uplink Control Channel (PUCCH) and is pending; or
- an uplink grant for a pending HARQ retransmission can occur and there is data in the corresponding HARQ buffer; or
- a PDCCH indicating a new transmission addressed to the Cell Radio Network Temporary Identifier (C-RNTI) of the UE has not been received after successful reception of a Random Access Response for the preamble not selected by the UE.

Voice Over LTE (VoLTE)

In LTE all packets are delivered using the Internet Protocol (IP). This means that also traditionally circuit switched services such as conversational voice will make use of fast scheduling and will be provided using Voice over IP (VoIP). In a typical VoIP arrangement a voice encoder on the transmitter side encodes the speech into packets with the typical speech duration of 20 ms, mandated by GSM Association (GSMA) IR.92.

GSMA IR.92 is a Permanent Reference Document (PRD), i.e. a reference instead of a standard, defining the minimum recommended set of features and functions in IMS, EPC and LTE RAN to deliver a VoIP based voice service. GSMA PRD IR.92 is adopted by the industry to ensure interoperability between network nodes as well as securing the service delivery.

VoLTE enables LTE networks to provide voice services. The mouth-to-ear delay introduced by the transport scheduling and transmission of the VoLTE packets is one of the main factors determining the experienced speech quality. This causes a relatively tight delay budget for VoLTE to ensure good speech quality. The normal delay budget in the eNB is 80 ms. Up to the limit of the delay budget the speech quality is good. This means that it in general is sufficient to schedule a VoLTE service once every 40 ms and bundle two packets. Such a scheduling method allows for a good balance between efficient usages of resources, good speech quality and enhanced battery performance.

When DRX is combined with VoLTE the UE is configured to monitor the PDCCH during one or more subframes with a 40 ms period. Since speech packets are produced once every 20 ms this DRX configuration allows for transmission of two speech packets every 40 ms. FIG. 1 illustrates VoLTE scheduling in uplink when configured to monitor the PDCCH during one or more subframes with a 40 millisecconds (ms) period.

Please note that both onDurationTimer and inactivity Timer defines periods where the UE is Awake. It is the time when no timers, between the onDurations, are running that the UE is asleep.

The advantage of this configuration is that two packets are scheduled per scheduling opportunity, allowing efficient use of PDCCH and other scheduling resources, while the scheduling delay is still less than the delay budget. However, the tight delay budget of VoLTE does require that the wake period is utilized for scheduling of the VoIP packets that are available. If the opportunity is missed, an additional delay of 40 ms is reducing the possibility to transmit the packets within the packet delay budget.

Handover

In wireless telecommunications, the term handover refers to the process of transferring an ongoing call or data session in a UE from one channel connected to the core network to another channel.

In telecommunications there may be different reasons why a handover might be conducted such as e.g.:
When the UE is moving away from the area covered by one cell and entering the area covered by another cell the call is transferred to the second cell in order to avoid call termination when the UE gets outside the range of the first cell.

When the capacity for connecting new calls of a given cell is used up and an existing or new call from a UE, which is located in an area overlapped by another cell, is transferred to that cell in order to free-up some capacity in the first cell for other UEs, who can only be connected to that cell.

In non-CDMA networks when the channel used by a UE becomes interfered by another UE using the same channel in a different cell, the call is transferred to a different channel in the same cell or to a different channel in another cell in order to avoid the interference.

Again in non-CDMA networks when the UE behavior changes, e.g. when a fast-travelling UE, connected to a large, umbrella-type of cell, stops then the call may be transferred to a smaller macro cell or even to a micro cell in order to free capacity on the umbrella cell for other fast-traveling UEs and to reduce the potential interference to other cells or users, this works in reverse too, when a user is detected to be moving faster than a certain threshold, the call can be transferred to a larger umbrella-type of cell in order to minimize the frequency of the handovers due to this movement.

In CDMA networks a handover, see further down, may be induced in order to reduce the interference to a smaller neighboring cell due to the "near-far" effect even when a UE still has an excellent connection to its current cell.

The most basic form of handover is when a UE call in progress is redirected from its current cell, referred to as source cell, to a new cell, referred to as target cell. In terrestrial networks the source and the target cells may be served from two different cell sites or from one and the same cell site. In the latter case the two cells are usually referred to as two sectors on that cell site. Such a handover, in which the source cell and the target cell are different cells, even if they are on the same cell site, is called inter-cell handover. The purpose of inter-cell handover is to maintain the call as the UE is moving out of the area covered by the source cell and entering the area of the target cell.

In LTE the UE normally triggers a handover by sending a measurement report, via the RRC protocol, including a specific Event, like EventA3. The different events are defined by 3GPP, TS 36.331. The eNB will then act on this measurement report, depending on situation and configuration, and prepare the target cell for an incoming handover. The source cell sends out a Handover Command, which may be referred to as RRC Connection Reconfiguration to the UE, via the RRC protocol, comprising all the information the UE needs to perform a successful handover to the target cell.

The transmission of both the Measurement Report and Handover Command such as the RRC Connection Reconfiguration are transmitted using a Signaling Radio Bearer (SRB) which is configured to use RLC ARQ, in AM.

Battery Performance

For a good end user experience it's important with a good battery performance, i.e. the battery should last until the next charging opportunity. Packet intensive services with a continuous flow of packets will put higher demands on the battery performance.

A way to increase the battery performance is to use DRX, where the UE is allowed to turn off the receiver and hence save battery. To be able to use this on services as voice and conversational video where a lot of packets are transferred with small inter arrival time, short onDuration and inactivity times in DRX is needed. These short times will on the other hand increase the risk of the UE being in a DRX sleep state when it is time to send or resend the Handover Command and the eNB will have to delay the transmission until the next onDuration i.e. a drx cycle later.

A problem is related to that RLC retransmissions may miss onDuration opportunities to transmit. Missed on Durations imply an increased delay of the data transmission from the eNB when using DRX, which may result in a negative impact on the ongoing session or in worse case a call drop due to a delayed procedure. If the delay hits RRC signaling data transmission for the handover procedure the impact of extra delay is much more severe.

SUMMARY

It is therefore an object of embodiments herein to further improve the performance of a wireless communications network.

According to a first aspect of embodiments herein, the object is achieved by a method performed by a network node for retransmitting a Radio Link Control, RLC, Protocol Data Unit, PDU, to a User Equipment, UE. The UE and the network node operate in a wireless communications network. The UE is configured to use Discontinuous Reception, DRX.

When an RLC PDU transmitted to the UE is indicated to not being received by the UE, the network node determines a time until a first DRX on-duration time period that is possible to allow time for Hybrid Automatic Repeat Request, HARQ, operations to complete a retransmission of a Medium Access Control, MAC PDU. The MAC PDU is associated to the RLC PDU.

The network node then initiates a retransmission of the RLC PDU to the UE according to the determined time.

According to a second aspect of embodiments herein, the object is achieved by a computer program comprising instructions, which when executed by at least one processor, cause the at least one processor to perform actions according to any of the claims 1-6.

According to a third aspect of embodiments herein, the object is achieved by a carrier comprising the computer program. The carrier is one of an electronic signal, an optical signal, an electromagnetic signal, a magnetic signal, an electric signal, a radio signal, a microwave signal, or a computer-readable storage medium.

According to a fourth aspect of embodiments herein, the object is achieved by a network node for retransmitting a Radio Link Control, RLC, Protocol Data Unit, PDU, to a User Equipment, UE. The UE and the network node are operable in a wireless communications network. The UE is adapted to be configured to use Discontinuous Reception, DRX. The network node is further configured to:

when an RLC PDU transmitted to the UE is indicated to not being received by the UE, determine a time until a first DRX on-duration time period that is possible to allow time for Hybrid Automatic Repeat Request, HARQ, operations to complete a retransmission of a Medium Access Control, MAC PDU, which MAC PDU is associated to the RLC PDU, and initiate a retransmission of the RLC PDU to the UE according to the determined time.

Since the network node determines a time until a first DRX on-duration time period that is possible to allow time for HARQ operations to complete a retransmission of a MAC PDU associated to the RLC PDU, and initiates a retransmission of the RLC PDU to the UE according to the determined time, the RLC retransmissions will not unnecessarily miss any onDuration opportunity to transmit. This in turn results in that the performance of the wireless communications network is further improved.

An advantage with embodiments herein is that they will shorten the delay of data transmissions needing the RLC ARQ functionality while DRX is used. A time critical RRC procedure, such as e.g. the HandOver (HO) procedure, is where the benefit is high since a delayed message increase the probability for failure.

BRIEF DESCRIPTION OF THE DRAWINGS

Examples of embodiments herein are described in more detail with reference to attached drawings in which.

DETAILED DESCRIPTION

As part of developing embodiments herein, the problem will first be further deliberated.

As mentioned above problem is related to that RLC retransmissions may miss on Duration opportunities to transmit. Missed on Durations imply an increased delay of the data transmission from the eNB when using DRX, which may result in a negative impact on the ongoing session or in worse case a call drop due to a delayed procedure. If the delay hits RRC signaling data transmission for the handover procedure the impact of extra delay is much more severe.

A basic reason for the problem is that the RLC ARQ functionality doesn't know anything about the transmission restrictions set by DRX. The RLC ARQ retransmissions will start its retransmission timers without regards to the transmission opportunities (on duration) given by DRX. This may lead to unnecessary delays of transmitting the data to the UE, see FIG. 3.

Figure 3:
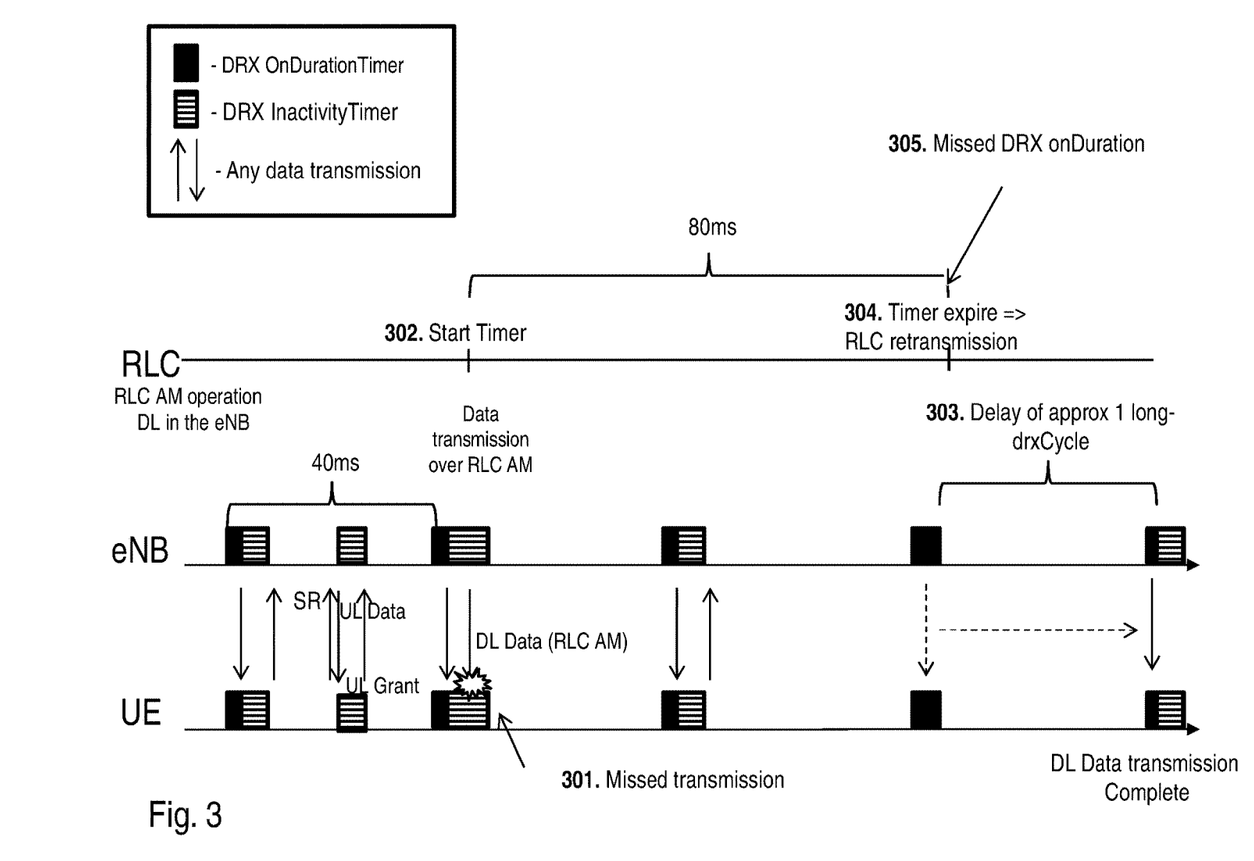
FIG. 3 is a schematic block diagram illustrating prior art.

FIG. 3 shows RLC AM operation DL in the eNB and transmissions between the eNB and the UE illustrating Delayed Data transmission due to DRX. The transmission of the Handover Command is usually very time critical. The UE is normally in a poor radio environment and will have problem receiving and transmitting any data and the radio conditions are often worsen over time, because the UE is moving out of the coverage of the serving cell. This gives that the transmission of the Handover Command, or rather segments of it is missed 301 e.g. due to fading or interference which starts 302 a t-PollretransmitTimer. The t-PollretransmitTimer is used by the transmitting side of an AM RLC entity in order to retransmit an RLC PDU. It is therefore often sent several times by RLC ARQ because of the poor radio link. These retransmissions are often affected by an unnecessary delay 303 due to DRX and since t-PollretransmitTimer expires 304 such that it misses 305 onDuration for the RLC retransmission.

Figure 4:
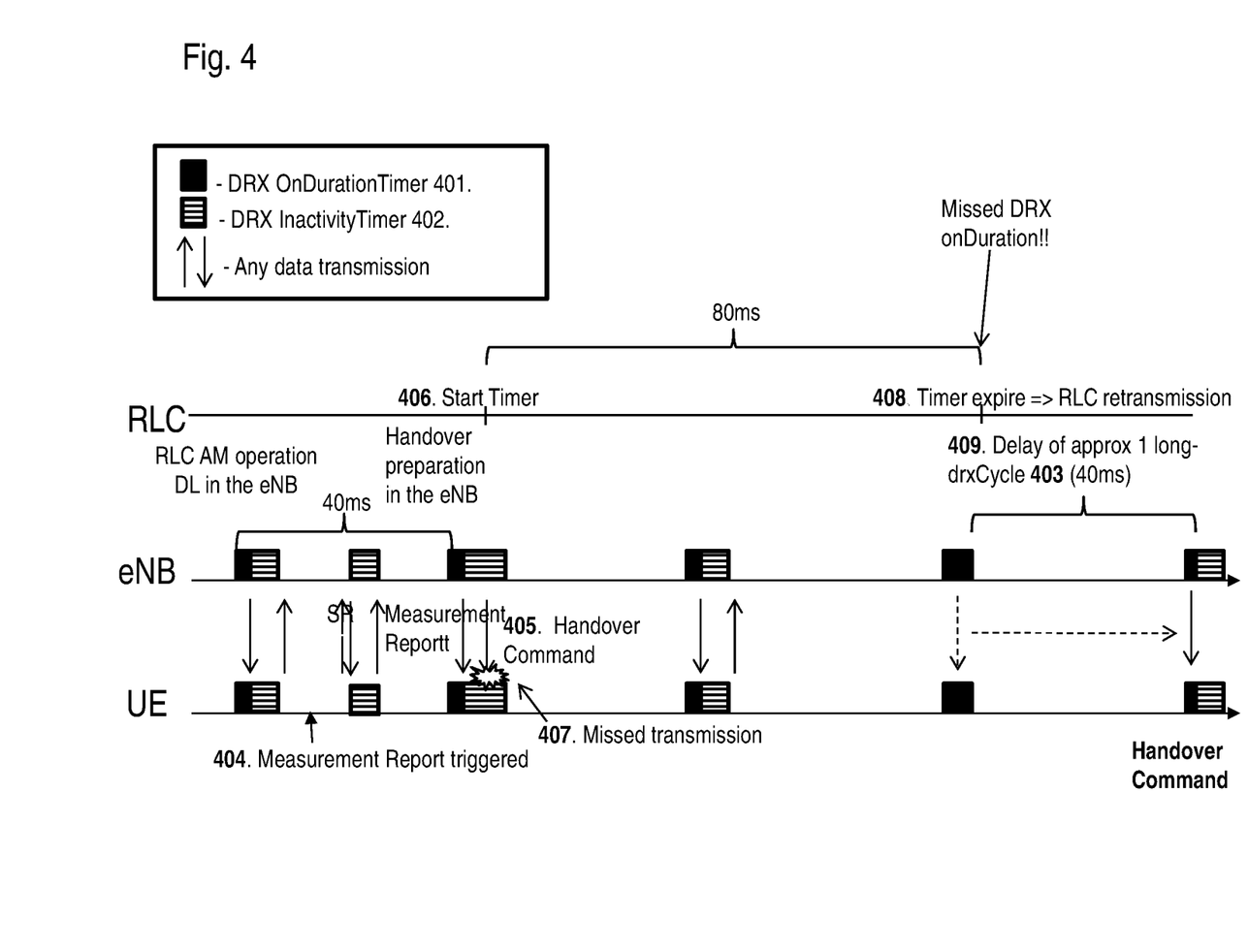
FIG. 4 is a schematic block diagram illustrating prior art.

FIG. 4 illustrates an example of the problem related to time critical handover procedure impact. In this scenario a UE with an active VoLTE call established. At this point the UE will have 2 SRBs+1 DRB with RLC UM+2 DRBs with RLC AM established. A Data Radio Bearer, DRB, is carrying user data to be used by the UE.

The UE has DRX activated and optimized for the VoLTE service, meaning short onDuration timer 401 e.g. <8 ms, short inactivity timer 402 e.g. <8 ms and a longCycle 403 of 40 ms.

This UE is moving towards the cell border of the serving cell and the radio conditions measured in the UE triggers an Event (Event A3) which the UE transmits 404 via a Measurement Report to the eNB.

The eNB receives the report, starts evaluating the result and decides to perform a handover of the UE into a target cell. The target cell is prepared and a Handover Command 405 such as an RRC Connection Reconfiguration is sent to the UE. This transmission is performed using SRB1. SRB1 is configured to use RLC ARQ, giving that as soon as the Handover Command is sent to the UE the RLC ARQ will start 406 a retransmission timer such as a tPollRetransmit Timer.

In this scenario, the handover Command is sent to the UE at a time when the DRX inactivityTimer is running, started due to any other transmission in UL or in DL.

Interference or fading is affecting this transmission and it is never received 407 by the UE.

When the retransmission timer expires 408 in RLC, RLC will resend the Handover Command. At this time though a DRX onDuration is just missed 409 and the UE is in DRX sleep and the DL retransmission of the handover command has to be delayed 410 until the next DRX onDuration, i.e. ~40 ms later.

This means that the radio environment has probably become even worse and at this time eNB will have decreased its chance to successfully transmit the handover command.

Even if the handover eventually succeeds, as below, this will introduce an unnecessary delay affecting the VoLTE speech quality for the end-user.

The text below relates to embodiments herein.

Figure 5:
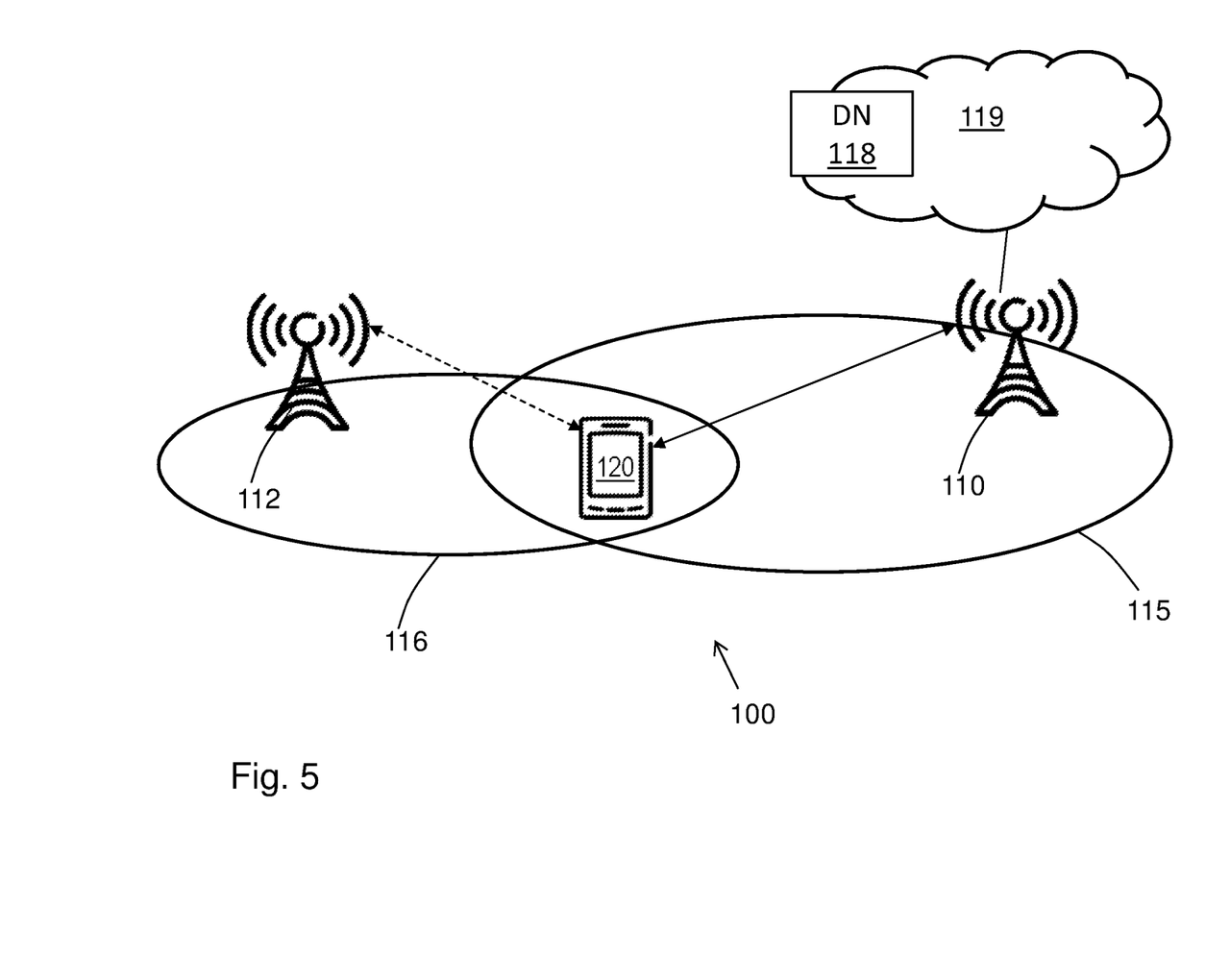
FIG. 5 is a schematic block diagram illustrating embodiments of a communications network.

FIG. 5 depicts an example of a wireless communications network 100 in which embodiments herein may be implemented. The wireless communications network 100 implementing embodiments herein may be a wireless communication network relating to any radio Access Technology (RAT) or multi-RAT system where a UE operates using MIMO, e.g. LTE TDD, GSM/GSM EDGE Radio Access Network (GERAN), Wi Fi, Wireless Local Area network (WLAN), WiMax, Code Divisional Multiple Access (CDMA) 2000, LTE-NX, Massive MIMO systems etc. EDGE is the abbreviation for Enhanced Data Rates for GSM Evolution, and NX LTE means next-generation 5G radio access technology.

A plurality of network nodes operate in the wireless communications network 100 whereof two, a network node 110 and a second network node 112 is depicted in FIG. 5. The network node 110 and the second network node 112 may for example refer to any type of network node serving a UE and/or being connected to other network nodes or network elements or any radio node from where a UE receives signals such as a radio base station, for example a Node B, an eNB, or an Home Node B, an Home eNode B or any other network node capable to serve a n electronic device such as a UE or a machine type communication device in a wireless communications network. The network node 110 serves a first cell 115 and the second network node 112 serves a second cell 116.

A method according to the first scenario is performed by the first network node 110. As an alternative, a Distributed Node (DN) 118 and functionality, e.g. comprised in a cloud 119 may be used for performing the method.

A UE 120 operates in the wireless communications network 100. The first UE 121 is capable of being served by the network node 110. In some example embodiments, the UE 120 is capable of performing a handover to the second cell 116 served by the second network node 122. The UE 120 is configured to use DRX.

The term UE when used herein may e.g. refer to a wireless device, a mobile wireless terminal or a wireless terminal, a mobile phone, a target device, a Device to Device (D2D) UE, a computer such as e.g. a laptop, a Personal Digital Assistants (PDAs) or an iPad, a tablet computer, sometimes referred to as a surf plate, with wireless capability, a smart phone, Laptop Embedded Equipment (LEE), Laptop Mounted Equipment (LME), Universal Serial Bus (USB) dongles or any other radio network units capable to communicate over a radio link in a wireless communications network. Please note the term UE used in this document also covers other wireless devices such as Machine to machine (M2M) devices.

Embodiments herein provide a DRX aware RLC ARQ. The above problem with delays will be minimized if the UEs DRX on Durations is considered when adapting the actual retransmission time instead of using the configured value of a retransmission timer such as e.g. the t-Pollretransmit Timer, see example below. The first appropriate DRX onDuration is the target for the retransmission. To avoid unnecessary retransmissions the actual adapted Timer value should however preferably be larger than a minimum value, here referenced as t-PollretransmitMin, to avoid too many retransmissions per time unit and also large enough to span all the HARQ retransmissions.

Figure 6:
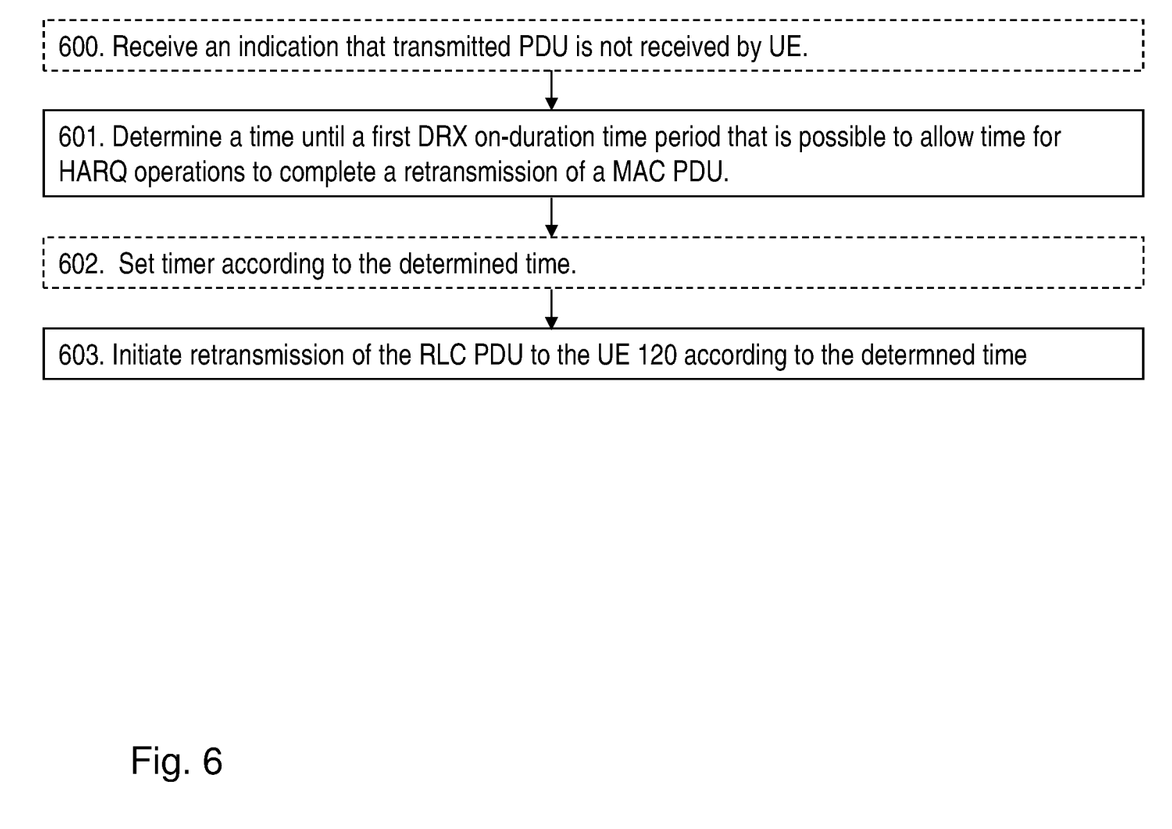
FIG. 6 is a flowchart depicting embodiments of a method in a network node.
Figure 7:
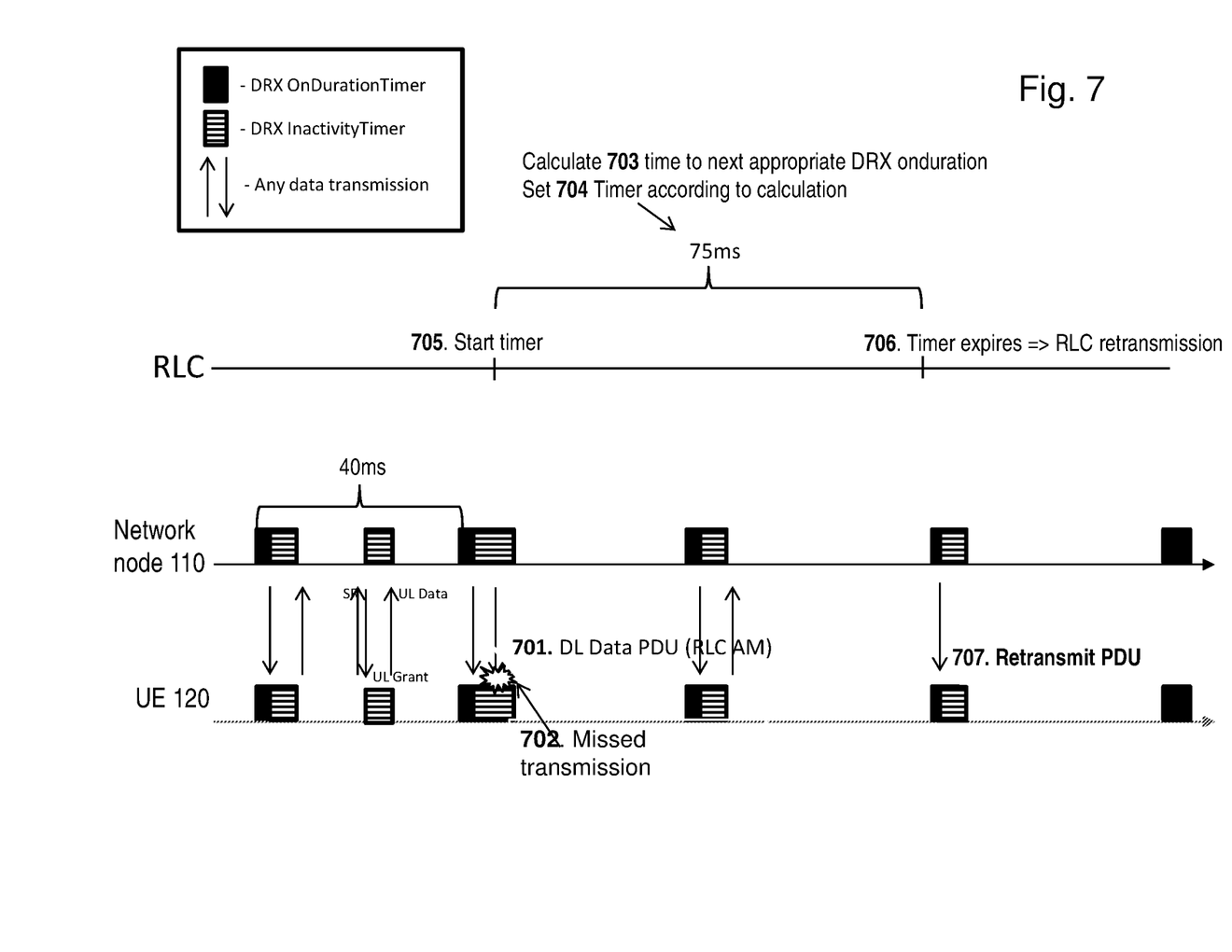
FIG. 7 is a schematic block diagram illustrating embodiments of a method.

Example embodiments of a method performed by the network node 110 for retransmitting an RLC PDU to the UE 120 will be described with reference to a flowchart depicted in FIG. 6. The method will in parallel be described with reference to FIG. 7 showing an example of an RLC AM operation DL in the eNB such as the network node 110. Reference numbers beginning with 6 relates to FIG. 6 and reference numbers beginning with 7 relates to FIG. 7. The method will further be described in a more general way first, and will be explained and exemplified more in detail later on. As mentioned above, the UE 120 and the network node 110 operate in a wireless communications network 100. The UE 120 is configured to use DRX.

As Mentioned above the method according is performed by the first network node 110. However, in some embodiments the Distributed Node 118 and functionality, e.g. comprised in the cloud 119 may be used for performing the method according to the Actions below. The method comprises the following actions, which actions may be taken in any suitable order. Actions that are optional are presented in dashed boxes in FIG. 6.

In an example scenario the network node 110 has transmitted 701 a PDU to the UE 120, such as a data transmission over RLC AM.

The UE 120 has 702 not received the PDU, e.g. due to fading or interference.

Action 600

The network node 110 may obtain an indication that a PDU transmitted to the UE 120 is not being received by the UE 120. This may e.g. be performed by the network node 110 receives a report comprising an indication the MAC PDU is not received, or a report comprising RLC PDUs received where the specific RLC PDU is missing, or no report has been received within a time limit, that the specific sent MAC PDU has been received Action 601

When a RLC PDU transmitted to the UE 120 is indicated to not being received by the UE 120, the network node 110 determines a time until a first DRX on-duration time period that is possible to allow time for HARQ operations to complete a retransmission of a MAC PDU. The MAC PDU is associated to the RLC PDU. This may e.g. be performed by the network node calculates the time until a first DRX on-duration time period by calculating 703 the time to next appropriate DRX onDuration which means 75 ms in the scenario in FIG. 7. This means that the default value of 80 ms will be changed to 75 ms according to the calculation. In this case the RLC PDU is included in the MAC PDU, i.e. in the transport block.

As mentioned above, the RLC AM mode supports ARQ in addition to the functions described above. The ARQ part makes it possible to have missing PDUs or portions of PDUs to be retransmitted. The transmitting side of a RLC AM entity such as the network node 110 may receive status PDUs from its receiver peer such as the UE 120 informing about which PDU sequence numbers have been received and which have not been received. A PDU that has not been reported as received will be retransmitted after a configured amount of time. The UE 120 may operate in AM such as RLC AM. In this case, the PDU transmitted to the UE 120 being indicated to not being received by the UE 120 is related to that the UE 120 operates in AM.

The time may be determined such that it is larger than a minimum retransmission timer such as e.g. t-PollretransmitMin. This is to give enough time for MAC HARQ to perform all its retransmissions before performing an RLC retransmission.

Action 602

In some embodiments, the network node 110 sets a timer according to the determined time. The timer may relate to a retransmission timer such as e.g. t-Pollretransmit Timer.

The setting of the timer according to the determined time may be performed instead of according to a preconfigured time value. In the example scenario of FIG. 7, the timer is set 704 to 75 ms according to the calculation, instead of the default value of 80 ms. The timer is then started 705.

Action 603

The network node 110 then initiates a retransmission of the RLC PDU to the UE 120 according to the determined time. In some embodiments the network node 110 retransmits the RLC PDU to the UE 120 according to the determined time.

As mentioned above in Action 602, in some embodiments the network node 110 sets the timer according to the determined time. In these embodiments, this action 603 of initiating a retransmission of the RLC PDU to the UE 120 according to the determined time comprises, i.e. is performed by initiating the retransmission of the RLC PDU to the UE 120 according to the expire of the timer. In the example scenario of FIG. 7, this is performed such that when the timer expires 706, i.e. after 75 ms, the network node 110 retransmits 708 the PDU. Thanks to that the time is set to 75 ms the transmission of the PDU will be sent in time before the on-duration time expires. If the timer did expire at 80 ms as according to prior art, then the transmission of the PDU would have missed the on-duration time.

The RLC PDU may e.g. relate to a handover command to the UE 120. This will be exemplified below.

Embodiment's herein will now be further described and explained. The text below is applicable to and may be combined with any suitable embodiment described above.

Figure 8:
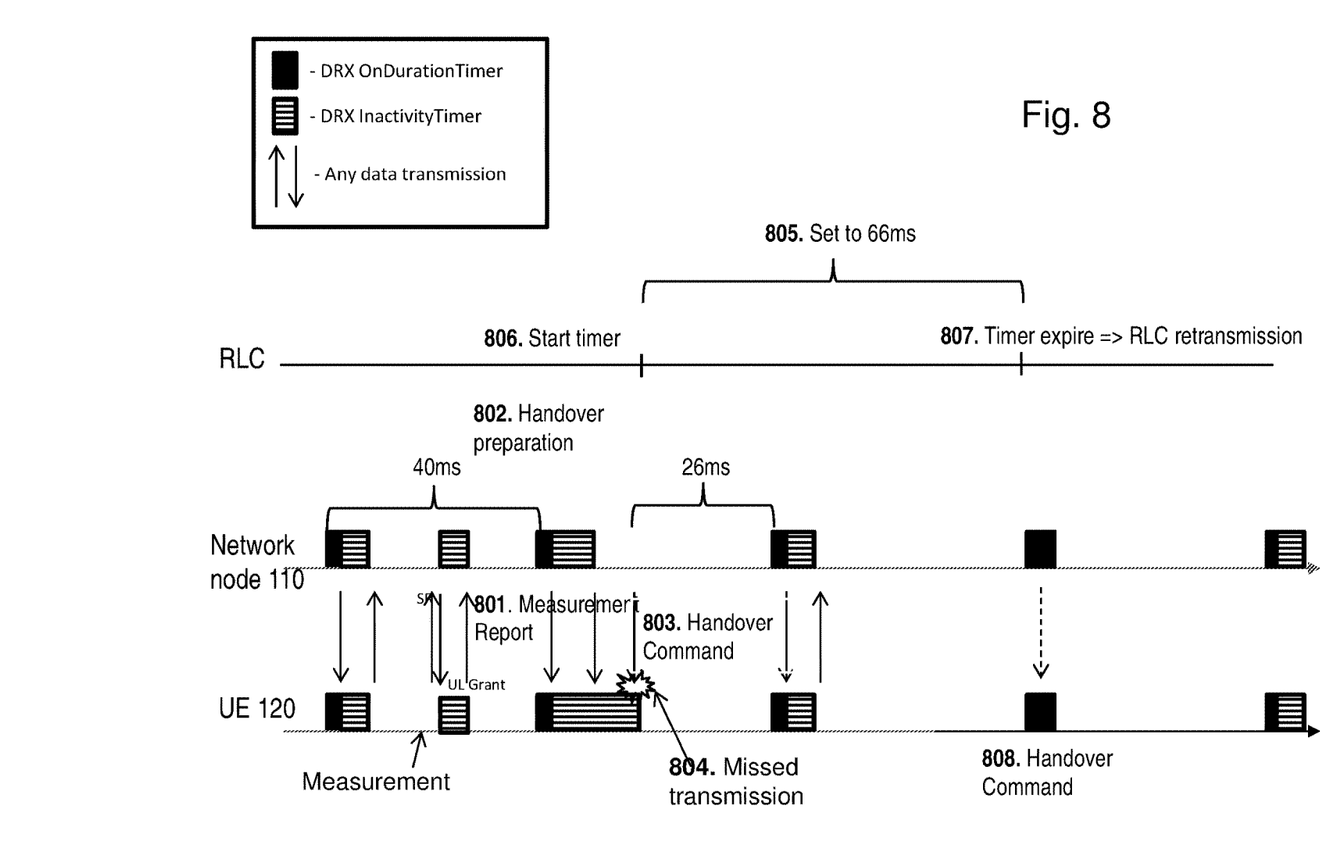
FIG. 8 is a schematic block diagram illustrating embodiments of a method.

An example scenario where the method according to embodiment herein is applicable relates to a handover procedure and specifically a handover command which may be referred to as HO Cmd. The example scenario is depicted in FIG. 8. FIG. 8 showing an example of an RLC AM operation DL in the eNB such as the network node 110 of a DRX aware RLC ARQ applied on Handover command (HO Cmd), according to the example scenario. That is, the PDU in this example is a HO Cmd.

In FIG. 8 a measurement report is sent 801, to the network node 110, triggered by the UE 120 e.g. at Event A3. The network node 110 performs handover preparation 802.

A HO Cmd is transmitted 803 during DRX inactivity i.e. when the UE 120 is awake as a result of earlier transmissions, which transmission 803 is missed 804, e.g. due to fading or interference. It is now left a short time period until the next on Duration. In this case the HARQ procedures will not be ready in time for the next onDuration, hence the second onDuration period is chosen. The reason is that HARQ should be allowed to use its retransmissions before the RLC retransmission occurs. The minimum time for this is as follows:

$$\text{Minimum RLC retransmission time due to HARQ} = (N-1) \times \langle \text{HARQ-interval} \rangle + \langle \text{HARQ-feedback-time} \rangle,$$

where N equals number of HARQ transmissions which is 4 in the example, each HARQ-interval is 8 ms (i.e. 3*8=24 ms) and HARQ-feedback-time is 4 ms.

In this example, 24 ms+4 ms, i.e. 28 ms would have been required to allow HARQ operations to complete, while only 26 ms where available until the first next on Duration.

The RLC retransmission occasion needs to target the second onDuration after the transmission failure and therefore is the RLC retransmission timer set 805 temporary adjusted to 66 ms, 26 ms until the first onDuration+40 ms drxCycle until the second onDuration for this particular situation, instead of the configured value of 80 ms of the timer such as the t-pollRetransmit Timer. The timer is started 806. When the timer expires 807, the HO Cmd is sent 808.

The result is that the PDU comprising the HO Cmd is sent one drxCycle earlier when RLC ARQ is DRX aware according to embodiments herein.

According to embodiments herein, the timer such as the RLC ARQ retransmission timer is made DRX onduration aware to avoid introducing unnecessary delays. It may still however consider the HARQ operation as it is more efficient, and introduces less delay, than the RLC retransmission.

Figure 9:
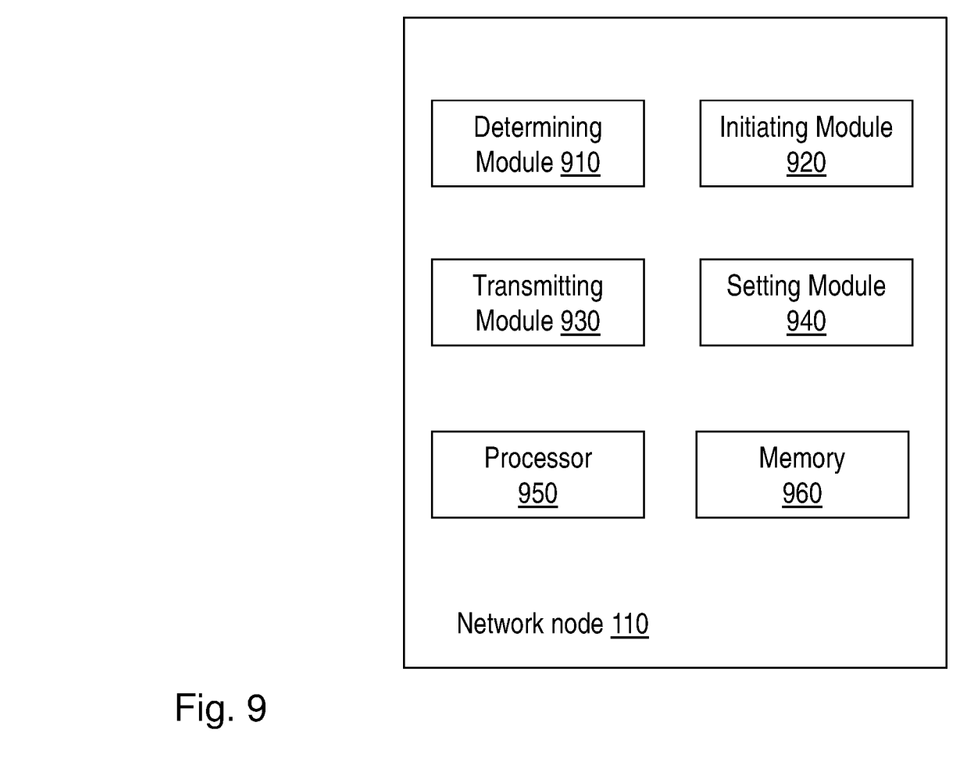
FIG. 9 is a schematic block diagram illustrating embodiments of a network node.

To perform the method actions for retransmitting a RLC PDU to the UE 120, the network node 110 may comprise the following arrangement depicted in FIG. 9. As mentioned above, the UE 120 and the network node 110 are operable in a wireless communications network 100. The UE 120 is adapted to be configured to use DRX. The RLC PDU may be adapted to relate to handover command to the UE 120.

The network node 110 is configured to, e.g. by means of an determining module 910 configured to, when an RLC PDU transmitted to the UE 120 is indicated to not being received by the UE 120, determine a time until a first DRX on-duration time period that is possible to allow time for HARQ operations to complete a retransmission of a Medium Access Control, MAC PDU, which MAC PDU is associated to the RLC PDU.

In some embodiments, the network node 110 further is configured to determine the time such that it is larger than a minimum retransmission timer.

The network node 110 is further configured to, e.g. by means of an initiating module 920 configured to, initiate a retransmission of the RLC PDU to the UE 120 according to the determined time. The network node 110 may further be configured to, e.g. by means of a transmitting module 930 configured to, retransmit the RLC PDU to the UE 120.

In some embodiments, the UE 120 is operable in AM and the RLC PDU transmitted to the UE 120 being indicated to not being received by the UE 120 is related to that the UE 120 is operating in AM.

The network node 110 may further be configured to, e.g. by means of a setting module 940 configured to, set a timer according to the determined time. In these embodiments, the network node 110 is further configured to, e.g. by means of the initiating module 920 configured to, initiate a retransmission of the RLC PDU to the UE 120 according to the determined time by initiating the retransmission of the RLC PDU to the UE 120 according to the expire of the timer.

The network node 110 may further be configured to set the timer according to the determined time instead of according to a preconfigured time value.

The embodiments herein may be implemented through one or more processors, such as a processor 950 in the network node 110 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 960 comprising one or more memory units. The memory 1460 comprises instructions executable by the processor 950.

The memory 960 is arranged to be used to store e.g. information about assigned resources, data, configurations, and applications to perform the methods herein when being executed in the network node 110.

In some embodiments, a computer program comprises instructions, which when executed by the at least one processor 950, cause the at least one processor 950 to perform actions according to any of the Actions 600-603.

In some embodiments, a carrier comprises the computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the network node 110, described above may refer to a combination of analog and digital circuits, and/or one or more processors configured with software and/or firmware, e.g. stored in the memory 960, that when executed by the one or more processors such as the processor 950 as described above. One or more of these processors, as well as the other digital hardware, may be included in a single Application-Specific Integrated Circuitry (ASIC), or several

ABBREVIATIONS

UE User Equipment
RLC Radio Link Control
PDCP Packet Data Convergence Protocol
MAC Medium Access Control
HARQ Hybrid Automatic Repeat Request
CQI Channel Quality Indicator
DRX Discontinuous Reception
DTX Discontinuous Transmission
PRB Physical Resource Block
PUCCH Physical Uplink Control Channel
PUSCH Physical Uplink Shared Channel
PDCCH Physical Downlink Control Channel
PDSCH Physical Downlink Shared Channel
NDI New Data Indicator
RVI Redundancy Version Indicator
SINR Signal to Interference Noise Ratio
CE Control Element
PDU Protocol Data Unit
SDU Service Data Unit
TBS Transport Block Size
VoLTE Voice Over LTE
RTT Round Trip Time
RRC Radio Resource Control

The invention claimed is:

1. A method, performed by a network node, for retransmitting a Radio Link Control (RLC) Protocol Data Unit (PDU) to a User Equipment (UE), wherein the UE and the network node operate in a wireless communications network, and wherein the UE is configured to use Discontinuous Reception (DRX), the method comprising:
  in response to an RLC PDU transmitted to the UE being indicated as not being received by the UE, determining a time until a first DRX on-duration time period that is possible to allow time for Hybrid Automatic Repeat Request (HARM) operations to complete a retransmission of a Medium Access Control (MAC) PDU, which MAC PDU is associated with the RLC PDU; and
  initiating a retransmission of the RLC PDU to the UE based on expiration of a timer, wherein the timer is set up according to the determined time.

2. The method of claim 1:
  wherein the UE operates in Acknowledged Mode (AM); and
  wherein the RLC PDU transmitted to the UE being indicated as not being received by the UE is related to that the UE operates in AM.

3. The method of claim 1, wherein setting the timer is performed instead of according to a preconfigured time value.

4. The method of claim 1, wherein the time is determined such that it is larger than a minimum retransmission timer.

5. The method of claim 1, wherein the RLC PDU relates to a handover command to the UE.

6. A non-transitory computer readable recording medium storing a computer program product for controlling a network node for retransmitting a Radio Link Control (RLC) Protocol Data Unit (PDU) to a User Equipment (UE), wherein the UE and the network node operate in a wireless communications network, and wherein the UE is configured to use Discontinuous Reception (DRX), the computer program product comprising software instructions which, when run on processing circuitry of the network node, causes the network node to:
  in response to an RLC PDU transmitted to the UE being indicated as not being received by the UE, determine a time until a first DRX on-duration time period that is possible to allow time for Hybrid Automatic Repeat Request (HARM) operations to complete a retransmission of a Medium Access Control (MAC) PDU, which MAC PDU is associated with the RLC PDU; and
  initiate a retransmission of the RLC PDU to the UE based on expiration of a timer, wherein the timer is set up according to the determined time.

7. A network node for retransmitting a Radio Link Control (RLC) Protocol Data Unit (PDU) to a User Equipment (UE), wherein the UE and the network node are operable in a wireless communications network, and wherein the UE is configured to use Discontinuous Reception (DRX), the network node comprising:
  processing circuitry;
  memory containing instructions executable by the processing circuitry whereby the network node is operative to:
    in response to an RLC PDU transmitted to the UE being indicated as not being received by the UE, determine a time until a first DRX on-duration time period that is possible to allow time for Hybrid Automatic Repeat Request (HARM) operations to complete a retransmission of a Medium Access Control (MAC) PDU, which MAC PDU is associated with the RLC PDU; and
    initiate a retransmission of the RLC PDU to the UE based on expiration of a timer, wherein the timer is set up according to the determined time.

8. The network node of claim 7:
  wherein the UE is operable in Acknowledged Mode (AM); and
  wherein the RLC PDU transmitted to the UE being indicated as not being received by the UE is related to that the UE is operating in AM.

9. The network node of claim 7, wherein the instructions are such that the network node is operable to set the timer according to the determined time instead of according to a preconfigured time value.

10. The network node of claim 7, wherein the instructions are such that the network node is operable to determine the time such that it is larger than a minimum retransmission timer.

11. The network node of claim 7, wherein the RLC PDU relates to a handover command to the UE.

* * * * *